(12) United States Patent
Kim et al.

(10) Patent No.: US 10,490,165 B2
(45) Date of Patent: Nov. 26, 2019

(54) MOBILE TERMINAL FOR CONTROLLING DYNAMIC RESOLUTION AND CONTROL METHOD THEREFOR

(71) Applicant: LG ELECTRONICS INC., Seoul (KR)

(72) Inventors: Hyosang Kim, Seoul (KR); Changho Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/764,436

(22) PCT Filed: Dec. 8, 2015

(86) PCT No.: PCT/KR2015/013381
§ 371 (c)(1),
(2) Date: Mar. 29, 2018

(87) PCT Pub. No.: WO2017/057799
PCT Pub. Date: Apr. 6, 2017

(65) Prior Publication Data
US 2018/0286355 A1  Oct. 4, 2018

(30) Foreign Application Priority Data

Sep. 30, 2015  (KR) .................. 10-2015-0138130

(51) Int. Cl.
*G09G 5/22*  (2006.01)
*G06F 3/0484*  (2013.01)
(Continued)

(52) U.S. Cl.
CPC .............. *G09G 5/227* (2013.01); *G06F 1/206* (2013.01); *G06F 1/3212* (2013.01);
(Continued)

(58) Field of Classification Search
None
See application file for complete search history.

(56) References Cited

U.S. PATENT DOCUMENTS

2007/0132787 A1* 6/2007 Ko ..................... G06F 3/14
345/660
2014/0137036 A1* 5/2014 Han ................ G06F 3/0482
715/798
(Continued)

FOREIGN PATENT DOCUMENTS

KR  10-2007-0097383 A   10/2007
KR  10-2010-0059568 A   6/2010
(Continued)

*Primary Examiner* — Kyle Zhai
(74) *Attorney, Agent, or Firm* — Birch, Stewart, Kolasch & Birch, LLP

(57) ABSTRACT

The present invention relates to a mobile terminal for controlling dynamic resolution, comprising: a display unit for receiving a user input for executing an application including a plurality of objects; a memory for storing setting information displaying, at a first resolution, a screen on the display unit; and a control unit for receiving information on a plurality of resolutions supported by the application, selecting a second resolution, which is the resolution of an execution screen on which the application is executed, on the basis of the first resolution and the plurality of resolutions, configuring the execution screen by synthesizing the plurality of objects with a system UI according to the second resolution, and up-scaling the configured execution screen according to a ratio of the first and second resolutions so as to display the up-scaled execution screen on the display unit. Therefore, dynamic resolution can be controlled.

14 Claims, 12 Drawing Sheets

(51) Int. Cl.
*H04M 1/725* (2006.01)
*G09G 5/36* (2006.01)
*G06F 1/3212* (2019.01)
*G06F 1/20* (2006.01)

(52) U.S. Cl.
CPC ........... *G06F 3/0484* (2013.01); *G09G 5/363* (2013.01); *H04M 1/725* (2013.01); *G09G 2340/0435* (2013.01); *H04M 1/72522* (2013.01); *H04M 2201/42* (2013.01)

(56) References Cited

U.S. PATENT DOCUMENTS

| | | |
|---|---|---|
| 2015/0130842 A1 | 5/2015 | Harper et al. |
| 2015/0179149 A1* | 6/2015 | Park .................. G06F 3/013 345/698 |
| 2017/0109011 A1* | 4/2017 | Jiang .................. G06F 1/1694 |

FOREIGN PATENT DOCUMENTS

| | | |
|---|---|---|
| KR | 10-2011-0032678 A | 3/2011 |
| KR | 10-2012-0049633 A | 5/2012 |

\* cited by examiner

FIG. 4
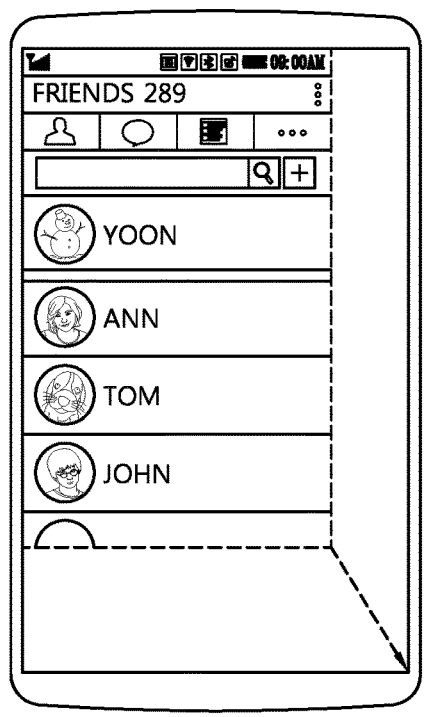
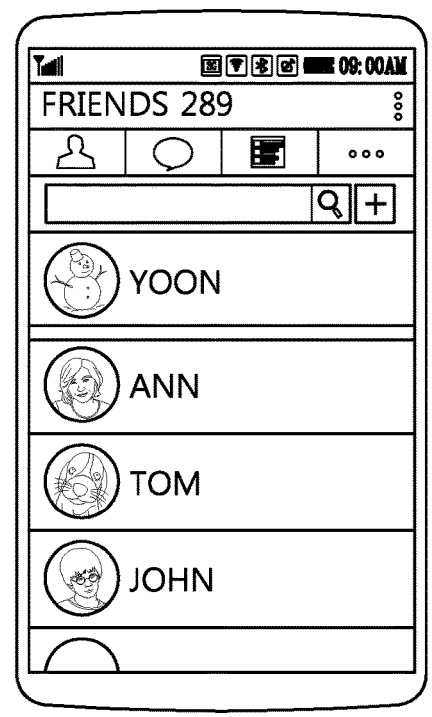
(a)                      (b)

MOBILE TERMINAL FOR CONTROLLING DYNAMIC RESOLUTION AND CONTROL METHOD THEREFOR

CROSS REFERENCE TO RELATED APPLICATIONS

This application is the National Phase of PCT international Application No. PCT/KR2015/013381, filed on Dec. 8, 2015, which claims priority under 35 USC. 119(a) to Patent Application No. 10-2015-0138130, filed in Republic of Korea on Sep. 30, 2015, all of which are hereby expressly incorporated by reference into the present application.

TECHNICAL FIELD

The present invention relates to a mobile terminal for performing dynamic resolution control and a method for controlling the same.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

To support and enhance the functionality of such a terminal, improvements to the structural and/or software parts of the terminal may be taken into consideration. A problem with such a terminal is that, compared to displays with high resolution, the user interface (UI) of an application installed on the terminal has a lower resolution than the displays.

Accordingly, in order to execute an application, a graphics processing unit (GPU) performs scaling on each of multiple components arranged on the application, which increases processing time and power consumption.

DISCLOSURE OF THE INVENTION

Therefore, an object of the present invention is to provide the aforementioned problem and other problems.

Another object of the present invention is to reduce the processing time and power consumption for dynamic resolution control.

In order to achieve these or other objects, a mobile terminal according to one aspect of the present invention comprises: a display unit for receiving a user input for executing an application including a plurality of objects; a memory for storing setting information displaying, in first resolution, a screen on the display unit; and a control unit for receiving information on a plurality of resolutions supported by the application, selecting a second resolution, which is the resolution of an execution screen on which the application is executed, on the basis of the first resolution and the plurality of resolutions, configuring the execution screen by synthesizing the plurality of objects with a system UI according to the second resolution, and up-scaling the configured execution screen according to a ratio of the first and second resolutions so as to display the up-scaled execution screen on the display unit.

In one embodiment, the second resolution may have minimum difference with the first resolution, among the plurality of resolutions.

In one embodiment, the control unit may comprise: a central processing unit that synthesizes the plurality of objects with the system UI; and a graphics processing unit that up-scales the execution screen including the plurality of synthesized objects according to the ratio of the first and second resolutions.

In one embodiment, the control unit may receive measurement values of factors associated with the change of the second resolution and select a third resolution, which is lower than the second resolution, based on the received measurement values.

In one embodiment, the up-scaling may be performed by stretching the pixels of the plurality of objects based on the above ratio.

In one embodiment, the factors may be based on at least one of the following: remaining battery power, a temperature sensed by a power manager, frames per second (FPS) required for the application, and the setting information.

In one embodiment, the control unit may execute the application at an application layer, receives the setting information at a framework layer, select the second resolution on the basis of the first resolution and the plurality of resolutions, display the execution screen at the second resolution, and perform the power management, memory management, and hardware management of the mobile terminal at a kernel layer.

In one embodiment, the first framework layer may comprise a first framework layer including an activity manager, a package manager, a window state manager, a window manager, and an input manager.

In one embodiment, the framework layer may further comprise a second framework layer including a process observer, a packager analyzer, a process filter, a scaler, a trigger monitor, and a task migrator.

In one embodiment, the framework layer may further comprise: a surface flinger that controls graphic layers in the application according to the ratio of the first and second resolutions; and a hardware composer that up-scales the execution screen with the plurality of objects arranged thereon according to the ratio of the first and second resolutions.

In one embodiment, the process observer may receive a launch request Request Launch corresponding to the execution of the application from the activity manager, the package analyzer may extract information on the plurality of resolutions from the application, the process filter may change the resolution from the first resolution to the second resolution and determine whether to apply the second resolution or not, and the scaler may send information on the second resolution to the window manager.

In one embodiment, the kernel layer may comprise a power manager, the trigger monitor may receive information on the temperature from the power manager and may receive information on the FPS and information on the user setting.

In order to achieve these or other objects, a mobile terminal according to another aspect of the present invention comprises: a display unit for receiving a user input for executing an application; a memory for storing setting information displaying, at a first resolution, a screen on the display unit; and a control unit for receiving information on a plurality of resolutions supported by the application, selecting a second resolution, which is the resolution of an execution screen on which the application is executed, on the basis of the first resolution and the plurality of resolutions, and displaying the execution screen on the display unit.

In one embodiment, the second resolution may have minimum difference with the first resolution, among the plurality of resolutions.

In one embodiment, the control unit may up-scale the execution screen with the plurality of objects arranged thereon according to the ratio of the first and second resolutions.

In one embodiment, the up-scaling may be performed by stretching the pixels of the plurality of objects based on the above ratio.

In one embodiment, the control unit may receive measurement values of factors associated with the change of the second resolution and select a third resolution, which is lower than the second resolution, based on the received measurement values.

In one embodiment, the factors may be based on at least one of the following: remaining battery power, a temperature sensed by a power manager, frames per second (FPS) required for the application, and the setting information.

In one embodiment, the control unit may comprise: a process observer that receives a launch request (Request Launch) corresponding to the execution of the application from an activity manager; and a package analyzer that extracts information on the plurality of resolutions from the application.

In one embodiment, the control unit may comprise: a process filter that changes the resolution from the first resolution to the second resolution and determines whether to apply the second resolution or not; and a scaler that sends information on the second resolution to a window manager.

BRIEF DESCRIPTION OF THE DRAWINGS

FIG. 4 illustrates an execution screen of an application displayed on a display unit before and after up-scaling according to the present invention.

MODES FOR CARRYING OUT THE PREFERRED EMBODIMENTS

Figure 1A:
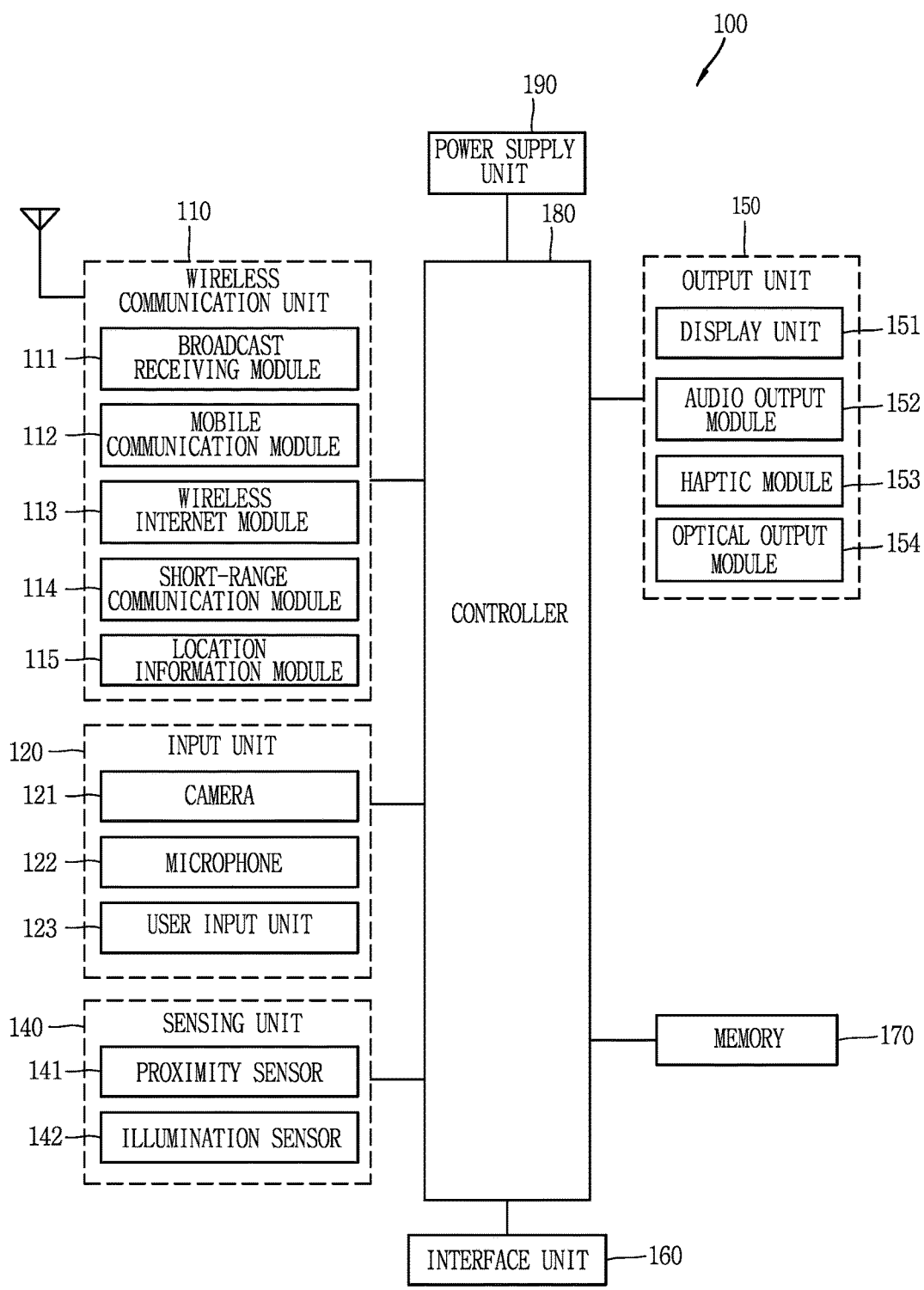
FIG. 1A is a block diagram illustrating a mobile terminal related to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
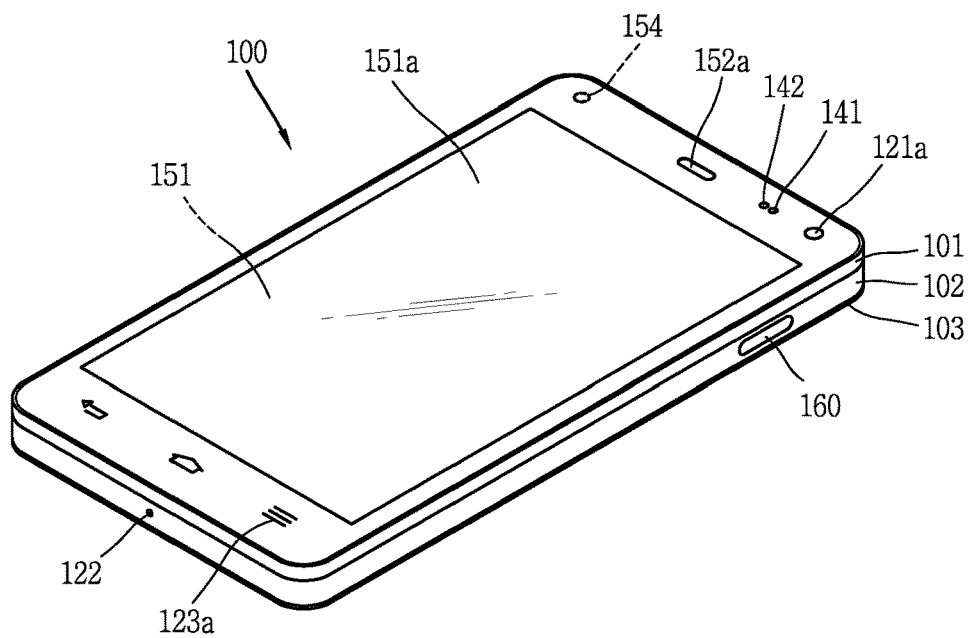
FIGS. 1B and 1C are conceptual diagrams of an example of a mobile terminal related to the present invention, as viewed from different directions.
Figure 1C:
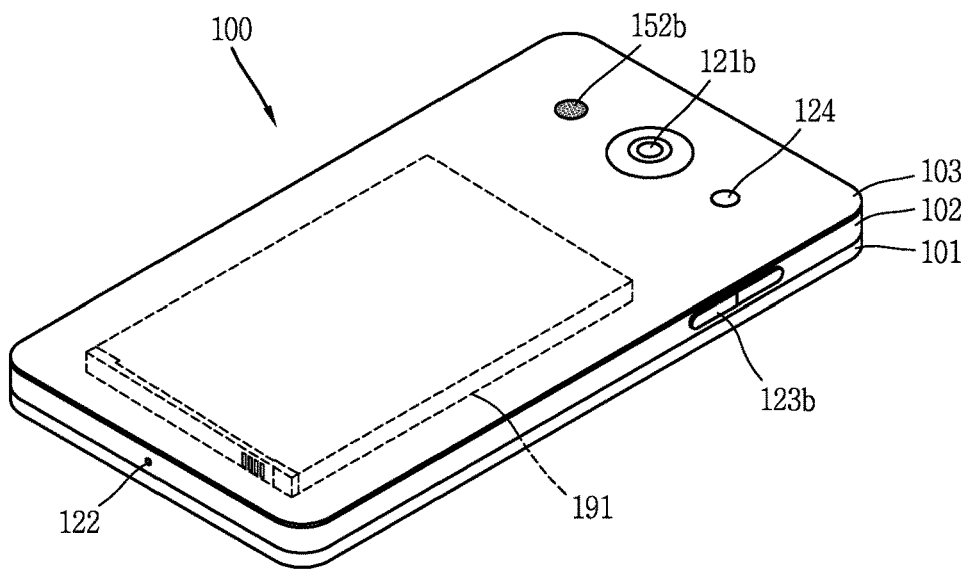

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 may provide or process information or functions appropriate for a user by processing signals, data, information and the like, which are input or output by the aforementioned various components or activating application programs stored in the memory 170.

Also, the controller 180 may control at least some of the components illustrated in FIG. 1A, to execute an application program that have been stored in the memory 170. In addition, the controller 180 may control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the electronic device at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

Meanwhile, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control operations relating to application programs and the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

As stated above, the scaling of each of multiple components for dynamic resolution control has the problem of an increase in processing time and power consumption.

To solve this problem, in the present invention, a mobile terminal 100 including a wireless communication unit 110, a display unit 151, memory 170, and a control unit 180 will be described with reference to FIG. 1A.

Figure 2:
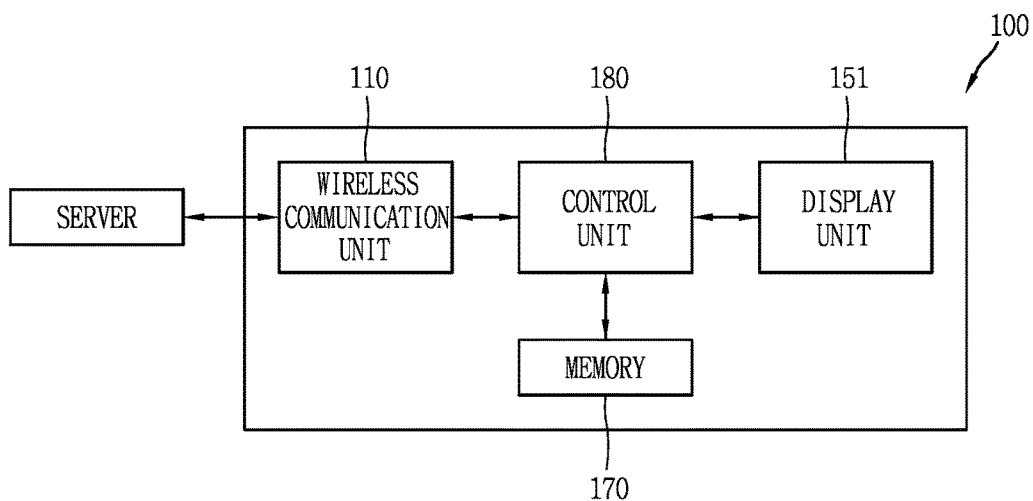
FIG. 2 is a block diagram of a mobile terminal that performs resolution control when an application is executed according to the present invention.
Figure 11:
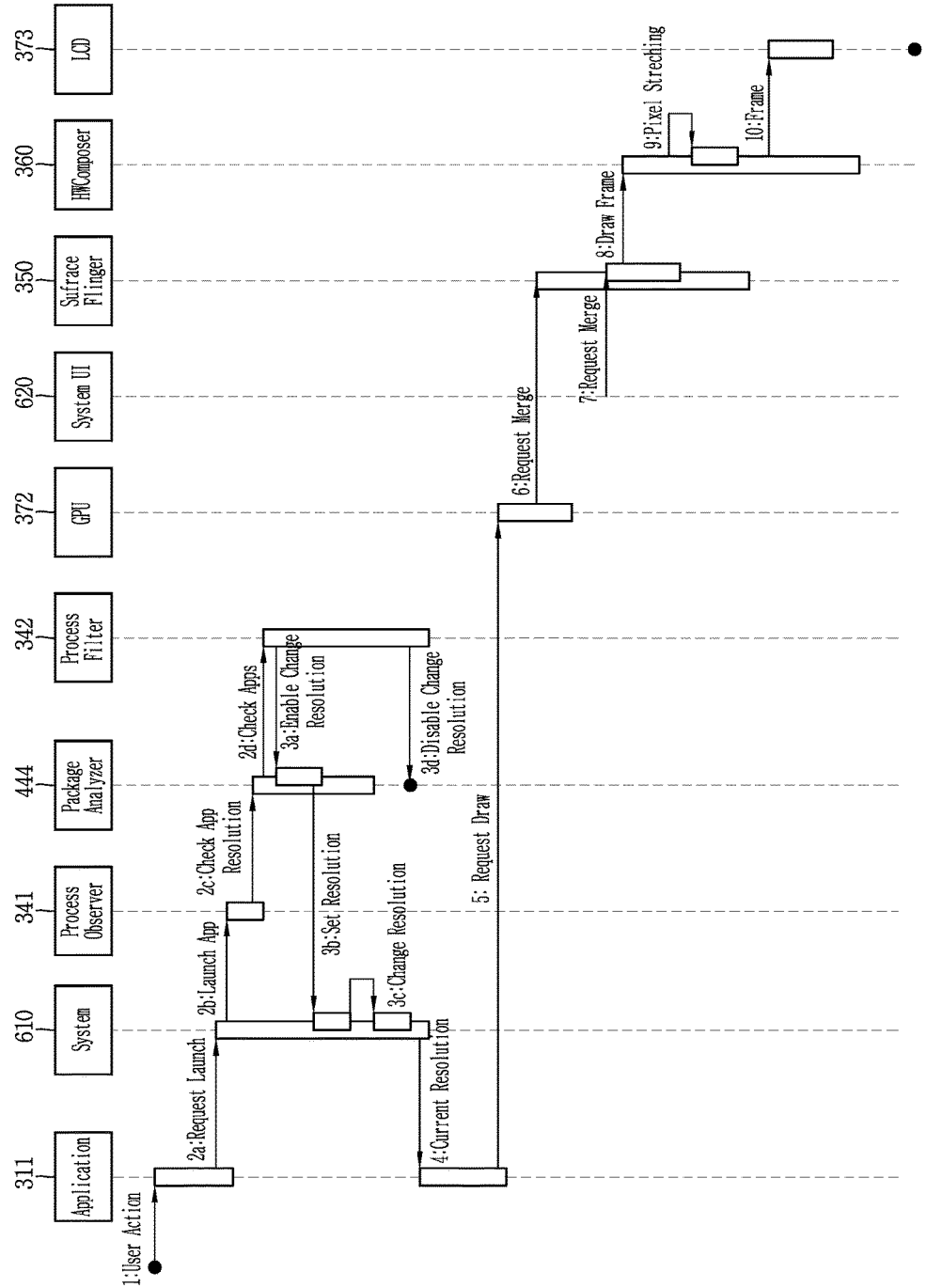
FIG. 11 is a signal flowchart of a dynamic resolution control method according to another embodiment of the present invention.

Referring to FIGS. 2 and 11, a detailed description will be given below of a method of dynamic resolution control when an application is executed on the mobile terminal of this invention including the wireless communication unit 110, display unit 151, memory 170, and control unit 180.

First of all, FIG. 2 is a block diagram of a mobile terminal that performs resolution control when an application is executed according to the present invention.

The mobile terminal 100 shown in FIG. 2 may include a wireless communication unit 110, a display unit 151, a memory 170, and a control unit 180.

The mobile terminal 100 may receive user input related to the execution of an application from the user, exchange data with a server hosting the application, and display the application on the screen.

Regarding the execution of the application, the wireless communication unit 110 may send or receive data to or from a server hosting an application service.

The memory 170 may store setting information for displaying a screen on the display unit 151 at a first resolution.

The control unit 180 receives information on a plurality of resolutions supported by the application. Moreover, the control unit 180 selects a second resolution, which is the resolution of an execution screen on which the application is executed, on the basis of the first resolution and the plurality of resolutions. Also, the control unit 180 displays the execution screen on the display unit 151 at the second resolution.

Regarding this, the controller 180 may perform the following functions and procedures. The control unit 180 configures the execution screen by synthesizing the plurality of objects with a system UI according to the second resolution. Furthermore, the control unit 180 up-scales the configured execution screen according to the ratio of the first and second resolutions and displays it on the display unit.

Here, the second resolution has minimum difference with the first resolution, among the plurality of resolutions. Moreover, the plurality of objects constituting the execution screen may be referred to as a plurality of components.

Figure 3:
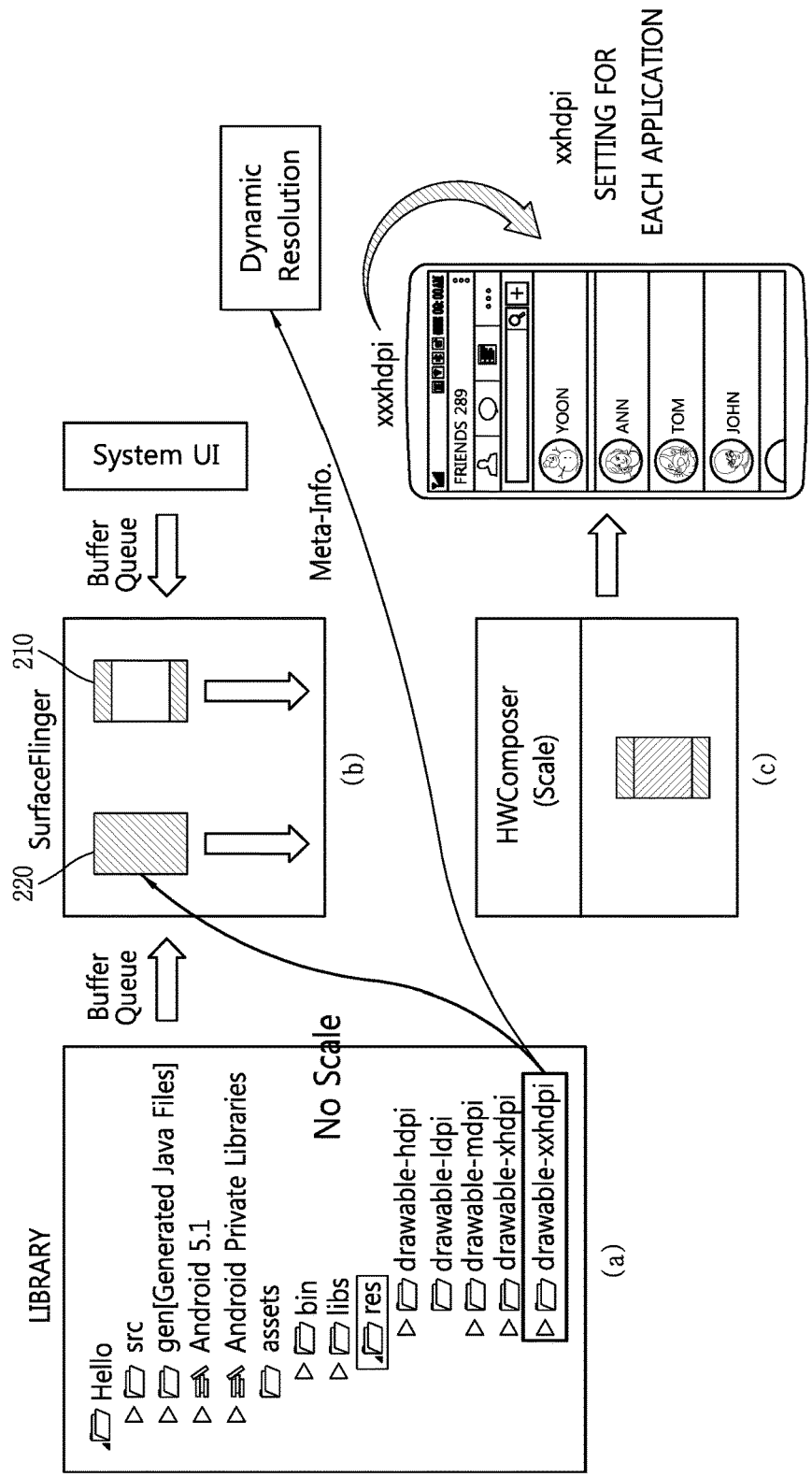
FIG. 3 is a view showing a process of selecting one of a plurality of resolutions supported by an application according to the present invention.

Regarding this, FIG. 3 is a view showing a process of selecting one of a plurality of resolutions supported by an application according to the present invention.

Referring to (a) of FIG. 3, a library on the resolution of an operating system executed by the control unit 180 is illustrated. The library includes drawable-ldpi, drawable-mdpi, drawable-hdpi, drawable-xhdpi, and drawable-xxhdpi.

The drawable-ldpi, drawable-mdpi, drawable-hdpi, drawable-xhdpi alc drawable-xxhdpi may have a resolution 0.75, 1, 1.5, and 2 times mdpi, for example. The ldpi, mdpi, hdpi, xhdpi, and xxhdpi correspond to the plurality of resolutions.

With the recent trend toward mobile terminals with larger screen size and higher resolution, a plurality of resolutions supported by an application often can't keep up with screen resolution settings. Moreover, if the screen resolution settings do not match any of the plurality of resolutions, there is a need to resolve the problem of resolution inconsistency when selecting one of the plurality of resolutions.

If the first resolution, which is a screen resolution setting on the mobile terminal, is higher than the plurality of resolutions, the application may support the first resolution. In this instance, a plurality of objects arranged on the application need to be up-scaled by as much as the difference in resolution. Regarding this, a graphics processing unit (GPU) performs the up-scaling, and a central processing unit (CPU) performs the re-arrangement of the plurality of objects on the screen.

The more the objects, the more often the GPU performs upscaling, which increases processing time and power consumption.

To solve this, when the application is executed, the first resolution, which corresponds to the system resolution, is changed to the second resolution, which is selected by the application. Here, the second resolution has minimum difference with the first resolution, among the plurality of resolutions. For example, the first resolution may be xxxhdpi, and the second resolution may be xxhdpi. Accordingly, dynamic resolution control is performed by changing the first resolution to the second resolution using metadata received from the library.

Referring to (b) of FIG. 3, the screen of the application may consist of a plurality of screens. The plurality of screens include a first screen 210 and a second screen 220. The first screen 210 may be a basic screen which is displayed even before the application is executed, and the second screen 220 may be an initial screen which appears when the application is executed.

Regarding the first screen 210, the control unit 180 is allocated a buffer queue from the system UI (user interface) and creates a first frame. Also, regarding the second screen 220, the control unit 180 is allocated a buffer queue from the application and creates a second frame. Here, the first frame of the first screen 210 and the second frame of the second screen 220 are created by a surface flinger.

Moreover, when the second resolution is selected, the screen of the application may be displayed only in part of the display unit. To solve this, the first screen 210 and the second screen 220 are synthesized together, and then the synthesized screens are up-scaled according to the ratio of the first and second resolutions. This may reduce processing time and power consumption, as compared to repetitively up-scaling the plurality of objects on the application and re-arranging them. Regarding this, (c) of FIG. 3 illustrates a full screen created by synthesizing the first screen and the second screen and up-scaling the synthesized screens. Here, the synthesis and up-scaling of the first screen 210 and the second screen 220 are performed by a hardware composer.

That is, the hardware composer up-scales the plurality of objects on the execution screen of the application according to the ratio of the first and second resolutions. Here, the up-scaling is performed by stretching the pixels of the plurality of objects based on this ratio.

Regarding this, FIG. 4 illustrates an execution screen of an application displayed on a display unit before and after up-scaling according to the present invention.

Referring to (a) of FIG. 4, the execution screen of the application is displayed on the display unit at the second resolution selected by the application before up-scaling.

Referring to (a) of FIG. 4, the screen is displayed only in part of the display unit because the second resolution is set lower than the first resolution set on the terminal. From this, it can be seen that there is a need to up-scale the execution screen according to the ratio of the first and second resolutions. Here, the up-scaling is performed by stretching the pixels on a full screen including the plurality of objects at once.

Referring to (b) of FIG. 4, the execution screen of the application is displayed on the display unit at the second resolution selected by the application after up-scaling.

Referring to (b) of FIG. 4, a full screen including the plurality of components is up-scaled at once according to the ratio of the first and second resolutions. This method is advantageous in terms of processing time and power consumption, as compared to resizing the plurality of objects displayed on the execution screen by the GPU according to the ratio of the first and second resolutions and arranging them by the GPU.

Figure 5:
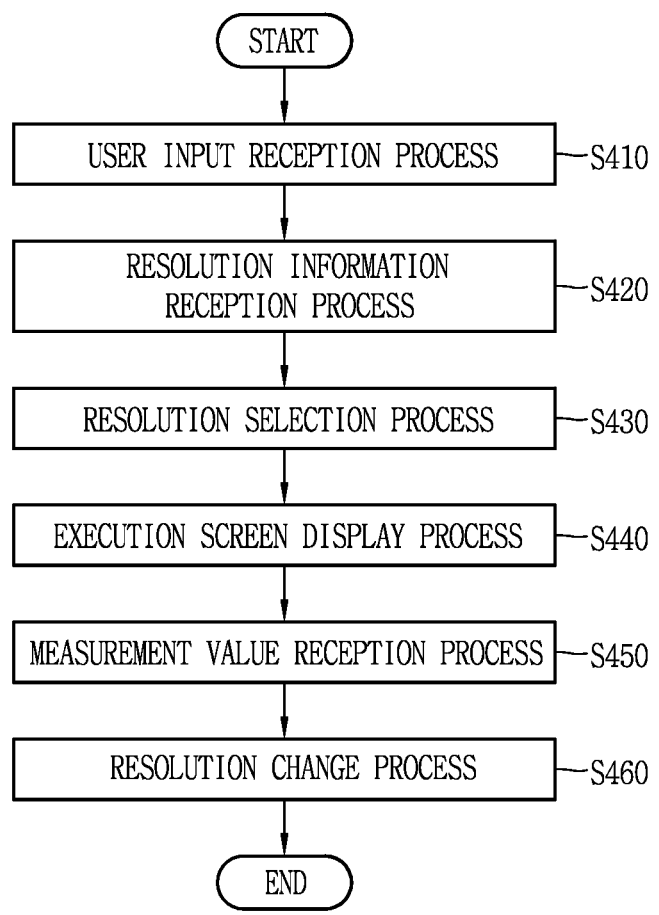
FIG. 5 is a flowchart showing a dynamic resolution control method according to the present invention.
Figure 6:
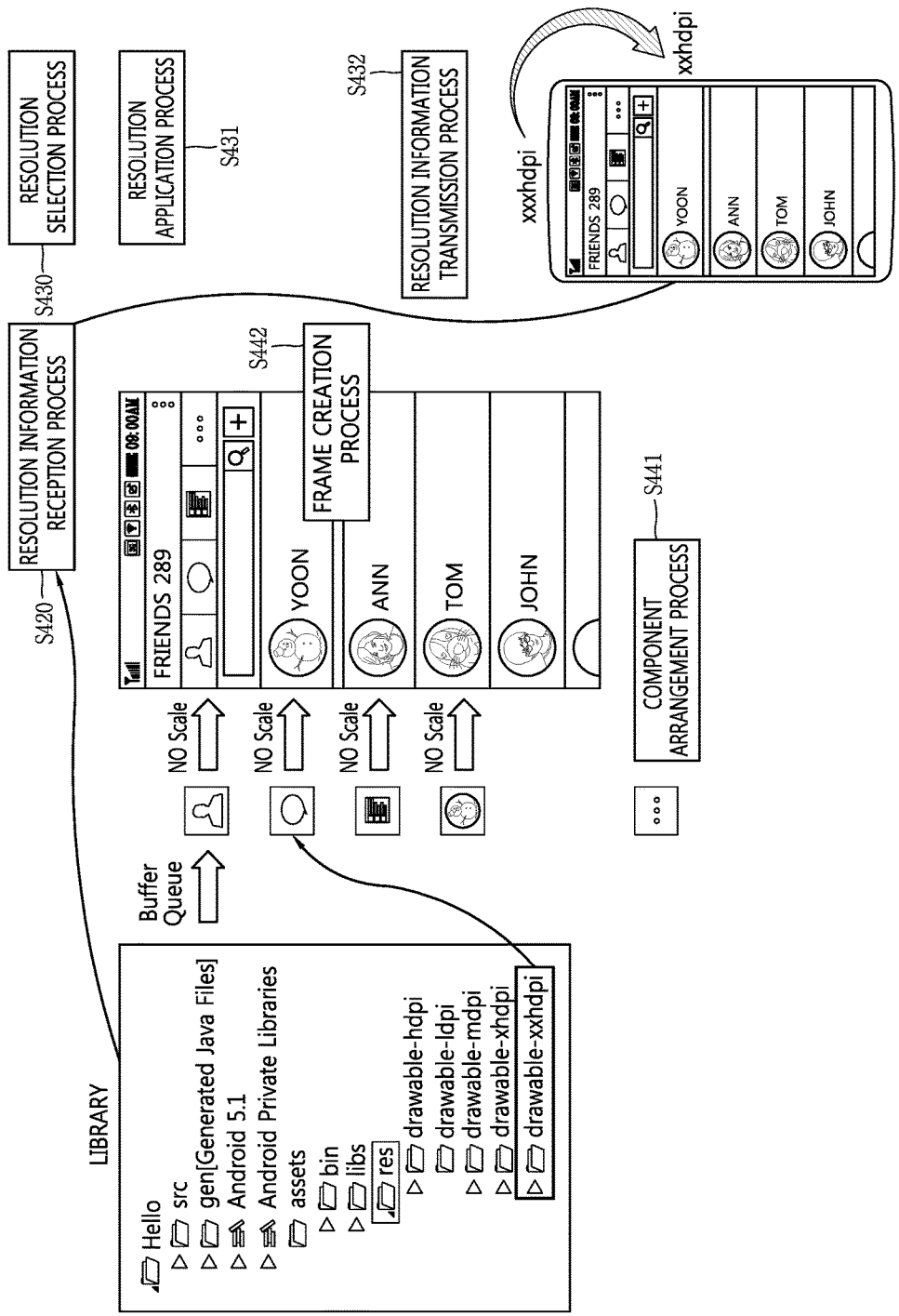
FIG. 6 is a conceptual diagram of the arrangement of a plurality of objects on a screen in an application according to the present invention.

FIG. 5 is a flowchart showing a dynamic resolution control method according to the present invention. FIG. 6 is a conceptual diagram of the arrangement of a plurality of objects on a screen in an application according to the present invention.

Referring to FIG. 5, the dynamic resolution control method includes a user input reception process S410, a resolution information reception process S420, a resolution selection process S430, and an execution screen display process S440. The dynamic resolution control method may further include a measurement value reception process S450 and a resolution change process S460.

In the user input reception process S410, a user input for executing an application on a screen displayed at a first resolution. Specifically, in the user input reception process S410, a process observer receives a launch request (Request Launch) corresponding to the execution of the application from an activity manager which operates upon execution of the application.

In the resolution information reception process S420, information on a plurality of resolutions supported by the application is received.

In the resolution selection process S430, a second resolution, which is the resolution of an execution screen on which the application is executed, is selected on the basis of the first resolution and the plurality of resolutions. Here, the second resolution has minimum difference with the first resolution, among the plurality of resolutions.

In the execution screen display process S440, the execution screen is displayed on the display unit at the second resolution. Here, in the execution screen display process S440, the execution screen on which the plurality of objects are arranged is up-scaled according to the ratio of the first and second resolutions. The up-scaling is performed by stretching the pixels of the plurality of objects based on this ratio.

Meanwhile, the resolution information reception process S420, resolution selection process S430, and execution screen display process S440 will be described in detail with reference to FIG. 6.

As discussed above, it can be seen that the system resolution of the mobile terminal may be changed to resolutions supported by an application. However, it should be noted that, when the application is finished, the system resolution may be changed back to the previous system resolution.

Moreover, the mobile terminal may re-change the resolution considering the power consumption or the like upon or during execution of the application. Regarding this, the measurement value reception process S450 and the resolution change process S460 may be performed.

In the measurement value reception process S450, measurement values of factors associated with the change of the second resolution are received. Here, the factors may be based on at least one of the following: remaining battery power, a temperature sensed by a power manager, frames per second (FPS) required for the application, and the setting information.

That is, dynamic resolution control may be performed in i) power saving mode, ii) heat reduction mode, iii) FPS adjustment mode, and iv) UI size adjustment mode. The power saving mode is a mode that is initiated when the remaining battery power of the terminal is at or below a preset battery level or as selected by the user. The heat reduction mode is a mode that is initiated when the temperature of the terminal is at or above a certain temperature or increases to cause software or hardware to clock down. The FPS mode is a mode that is initiated to adjust the number of frames per second displayed on the screen of the application. The UI adjustment mode is a mode that is initiated to resize objects for the sake of people with bad eyesight.

In the resolution change process S460, a third resolution, which is lower than the second resolution, is selected based on the received measurement values. That is, it is determined that the modes are initiated based on the received measurement values, and the third resolution, lower than the second resolution, may be selected.

Referring to FIG. 6, in the resolution information reception process S420, the application receives information on resolutions built from the library through a framework.

The resolution selection process S430 includes a resolution application process S431 and a resolution information transmission process S432.

In the resolution application process S431, the first resolution, which is the system resolution, is changed to the second resolution, which is one of the resolutions of the application, and a process filter determines whether to apply the second resolution or not.

In the resolution information transmission process S432, a scaler sends information on the second resolution to a window manager.

In the execution screen display process S440, the execution screen is displayed on the display unit at the second resolution. The execution screen display process S440 includes a component arrangement process S441 and a frame creation process S442.

In the component arrangement process S441, a plurality of objects are arranged on the execution screen according to the second resolution. In a case where the system resolution has been already changed from the first resolution to the second resolution, if the plurality of objects are displayed at the second resolution, they are arranged across the entire execution screen.

However, the user input reception process S410 may be performed in advance before the system resolution is changed to the second resolution and applied through the resolution information transmission process S432. Accordingly, if the plurality of objects are displayed at the second resolution, they may be arranged only in part of the execution screen.

Therefore, in the frame creation process S442, the execution screen on which the plurality of objects are arranged is up-scaled according to the ratio of the first and second resolutions. The up-scaling may be performed by stretching the pixels of the plurality of objects based on this ratio.

Figure 7:
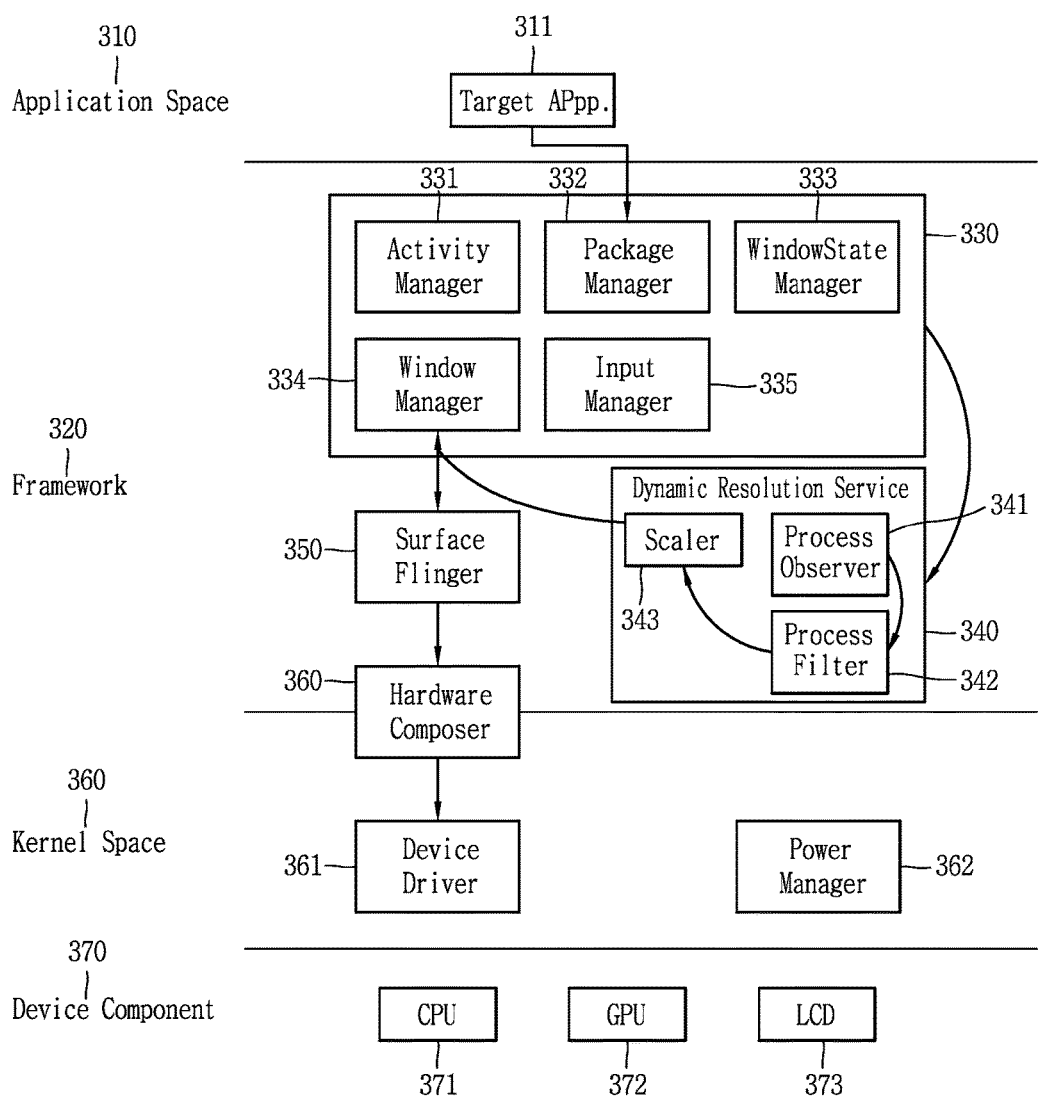
FIG. 7 illustrates a hierarchical structure that performs a dynamic resolution control method according to an embodiment of the present invention.

FIG. 7 illustrates a hierarchical structure that performs a dynamic resolution control method according to an embodiment of the present invention.

Regarding this, the control unit 180 executes the application at an application layer, receives the setting information at a framework layer, selects the second resolution on the basis of the first resolution and the plurality of resolutions, displays the execution screen at the second resolution, and performs the power management, memory management, and hardware management of the mobile terminal at a kernel layer.

The hierarchical structure includes an application layer 310, a framework layer 320, a kernel layer 360, and a device component layer 370.

The application layer 310 includes core applications such as an email client, a text messaging program, a calendar, a map, a browser, a phonebook, etc. The applications included in the application layer 310 may be written in the Java programming language.

Regarding the execution of an application at the application layer 310, the application layer 310 executes the application based on a user input for executing the application. The application layer 310 includes a target application 311 that is executed based on user input.

The framework layer 320 provides access to components and hardware used to make an application, a user interface, resource management, etc. Developers have full access to the same framework APIs used by the core applications. The framework layer 320 may include a set of libraries written in C/C++.

When the application is executed, the framework layer 320 selects the second resolution on the basis of the first resolution and the plurality of resolutions and displays the execution screen of the application at the second resolution.

The framework layer 320 includes a first framework layer 330 and a second framework layer 340. Here, the second framework layer 340 provides dynamic resolution service when the application is executed.

The first framework layer 330 includes an activity manager 331, a package manager 332, a window state manager 333, a window manager 334, and an input manager 335.

The activity manager 331 manages the life cycle of the application. That is, the activity manager 331 detects whether the application is executed, and upon execution of the application, generates a launch request (Request Launch) corresponding to the execution of the application.

The package manager 332 manages information on an application running on the system. The information includes the name of the application, package information, and version information. Moreover, the information includes the position where the application is installed and the position where a particular package of the application is installed.

The window state manager 333 detects the screen status of the display unit or whether the screen rotates. That is, the window state manager 333 may detect whether the screen is inactive or active or whether the screen is locked or not. Moreover, the window state manager 333 may detect whether the screen is horizontal or vertical.

The window manager 334 is in charge of a screen related to an application. That is, the window manager 334 receives information related to the screen resolution of an application and creates a screen based on the screen resolution.

The input manager 335 recognizes the touch coordinates of the location of a user's touch input and senses an event related to the user's input based on the resolution of the application and the touch coordinates.

The second framework layer 340 includes a process observer 341, a process filter 342, and a scaler 343.

The process observer 341 receives a launch request (Request Launch) corresponding to the execution of the application from the activity manager 331.

The process filter 342 changes the resolution from the first resolution to the second resolution and determines whether to apply the second resolution or not.

The scaler 343 sends information on the second resolution to the window manager 334.

The frame layer 320 includes a surface flinger 350 and a hardware composer 360.

The surface flinger 350 collects multiple surface data from an application at the application layer 310 and passes it to a frame buffer. That is, the surface flinger 350 controls graphic layers in the application according to the ratio of the first and second resolutions. Regarding this, referring to (b) of FIG. 2, the surface flinger 350 generates information on a plurality of screens, i.e., first and second screens, and sends this information to the hardware composer 360.

Meanwhile, in a case where the first resolution is changed to the second resolution, the surface flinger 350 changes the system resolution to the second resolution and notifies the window manager 334 about this. In response to this notification, the window manager 334 may allocate framebuffers which are reduced by as much as the reduction in resolution.

The hardware composer 360 up-scales a plurality of objects on the execution screen according to the ratio of the first and second resolutions. That is, the hardware composer 360 may stretch the pixels on the first and second screens based on this ratio.

The kernel layer 360 performs the power management, memory management, and hardware management of the mobile terminal. The kernel layer 360 includes a device driver 361 and a power manager 362.

The device driver 361 includes drivers for controlling the hardware of the mobile terminal. The device driver 361 may include a display driver, a USB driver, a camera driver, a Bluetooth driver, a WiFi driver, a memory driver, an audio driver, a binder driver, etc.

Meanwhile, a screen created by the hardware composer 360 may be displayed on a display LCD through the device driver 361.

The power manager 362 manages the power consumption of each application. Regarding this, the power manager 362 manages power consumption via an interface with a power management integrated chip (PMIC). The power manager 362 may monitor the remaining power and the mobile terminal's temperature.

The device component layer 370 includes a plurality of device objects. For example, the plurality of device objects may include a central processing unit (CPU) 371, a graphics processing unit (GPU) 372, and a display LCD 373.

Figure 8:
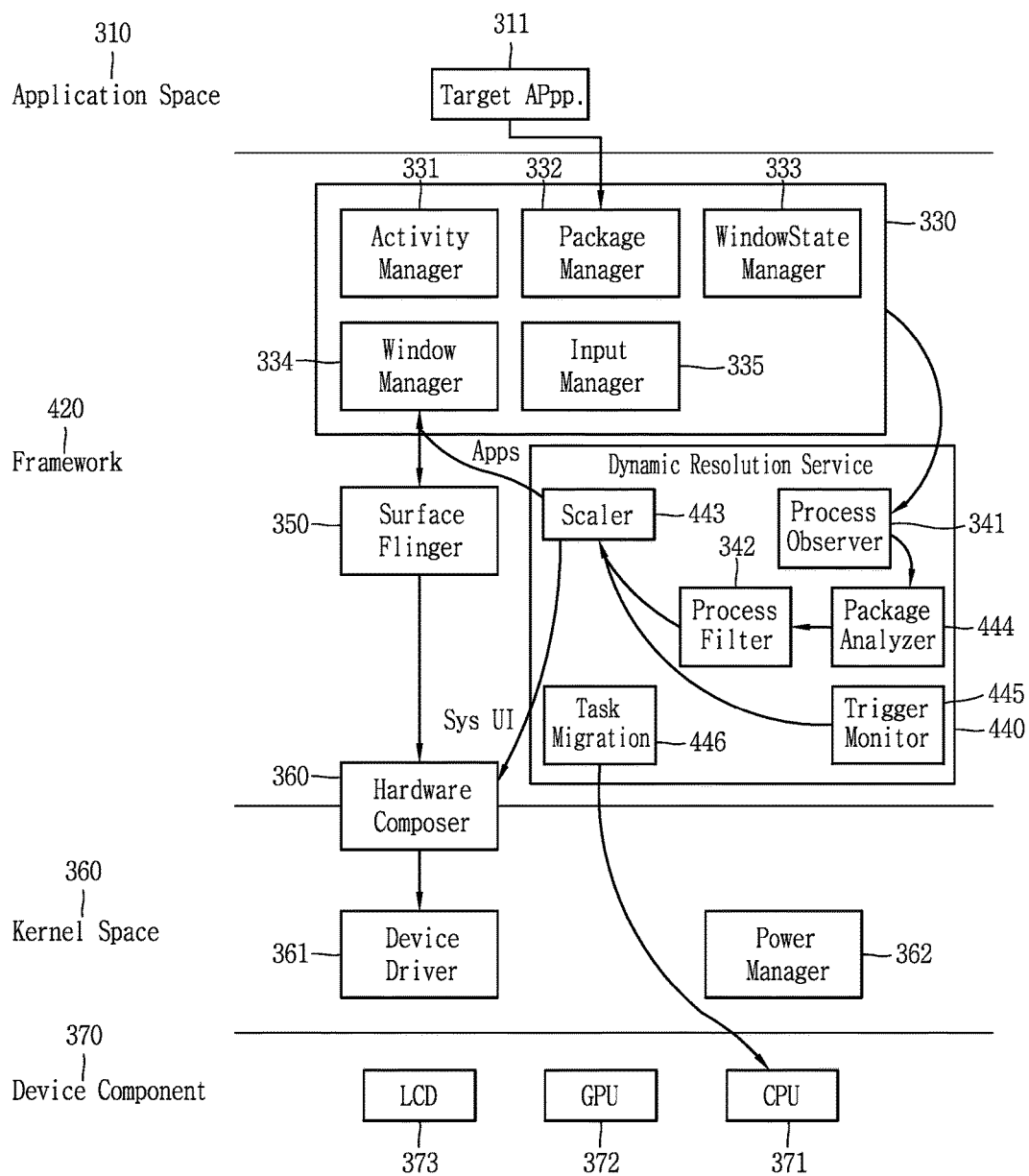
FIG. 8 illustrates a hierarchical structure that performs a dynamic resolution control method according to another embodiment of the present invention.

FIG. 8 illustrates a hierarchical structure that performs a dynamic resolution control method according to another embodiment of the present invention.

The hierarchical structure includes an application layer 310, a framework layer 420, a kernel layer 360, and a device component layer 370.

Descriptions of the application layer 310, kernel layer 360, and device component layer 370 will be replaced with the descriptions of FIG. 3.

The framework layer 420 includes a first framework layer 330, a second framework layer 440, a surface flinger 350, and a hardware composer 460.

Descriptions of the first framework layer 330 and surface flinger 350 will be replaced with the descriptions of FIG. 3.

The second framework layer 440 includes a process observer 341, a process filter 342, a scaler 443, a packager analyzer 444, a trigger monitor 445, and a task migrator 446.

Here, descriptions of the process observer 341 and process filter 342 will be replaced with the descriptions of FIG. 3.

The package analyzer 444 extracts information on the plurality of resolutions from the application.

The trigger monitor 445 monitors at least one of the following: the remaining battery power and temperature sensed by the power manager 362, the frames per second (FPS) required by the application and setting information.

Moreover, if the remaining battery power and the temperature are out of a preset range, the trigger monitor 445 notifies the scaler 443 about this.

In addition, if the FPS and the setting information are changed, the trigger monitor 445 notifies the scaler 443 about this.

Based on the notification from the trigger monitor 445, the scaler 443 may select the third resolution, which is lower than the second resolution.

The task migrator 446 detects interrupts for task scheduling and memory, disc, and network management and sends them to the CPU 371 based on the detection, and the CPU 371 performs the scheduling and interrupts.

Meanwhile, a screen created by the hardware composer 360 may be displayed on the display (LCD) 373 by the graphics processing unit (GPU) 372 through the device driver 361. Also, as shown in FIG. 6, a screen created by the hardware composer 360 may be displayed on the display (LCD) 373 through the device driver 361.

As shown in FIGS. 7 and 8, primary components that perform the dynamic resolution control method at the framework layer are the window manager 334, the surface flinger 350, and the hardware composer 360.

Figure 9:
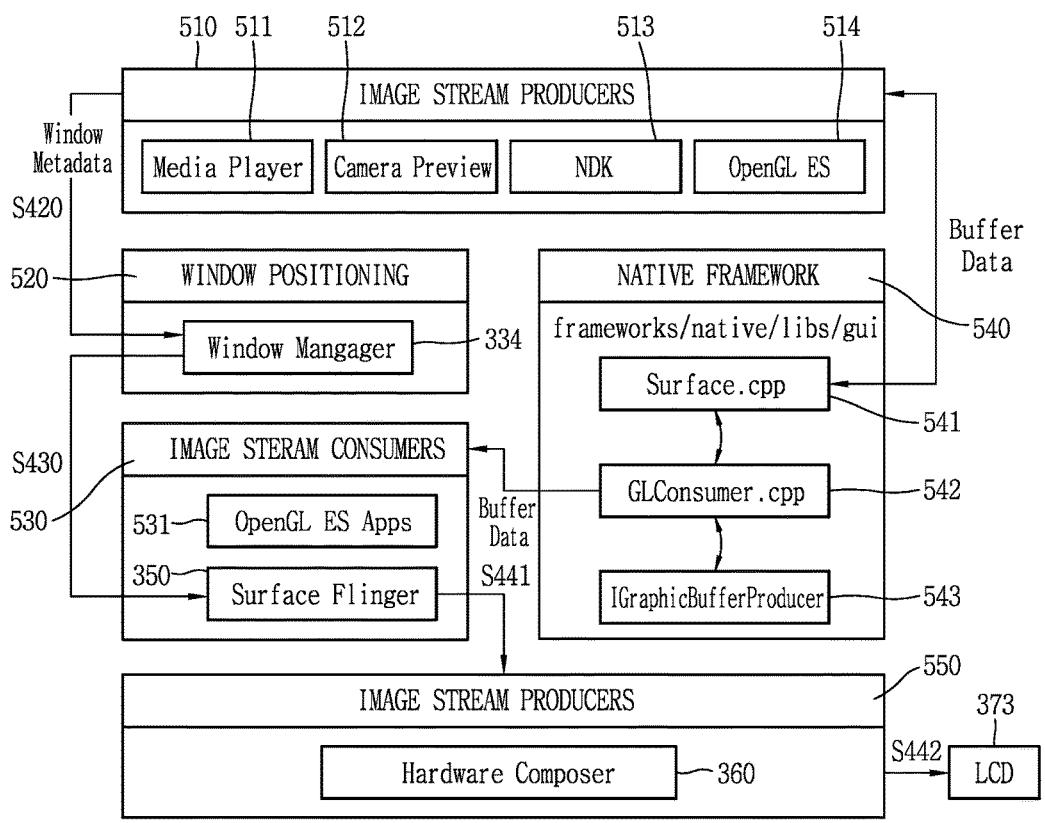
FIG. 9 is a diagram including detailed components for performing dynamic resolution control and related detailed components according to the present invention.

Regarding this, FIG. 9 is a view showing primary components for performing dynamic resolution control and related detailed components according to the present invention.

Referring to FIG. 9, the primary components include image stream producers 510, a window positioning unit 520, image stream consumers 530, a native framework 540, and a hardware abstract layer (HAL) 550.

The image stream producers 510 include a media player 511, a camera preview 512, an NDK (native developer's kit) 513, and an OpenGL ES 514.

As shown in FIGS. 6 and 7, the window positioning unit 520 includes the window manager 334.

The image stream consumers 530 include OpenGL ES Apps 531 and a surface flinger 350.

The native framework 540 includes a surface control object (Surface.cpp) 541, a GLConsumer (GLConsumer.cpp) 542, and IGrphicBufferProducer (IGrphicBuffer Producer.cpp) 543. Here, the surface control object 541 is created as native, and outputs a screen by interfacing with the surface flinger 350.

The HAL 550 includes a hardware composer 360.

Meanwhile, the aforementioned media player 511 and camera preview 512 represent types of applications related to image streams.

The NDK 513 is a developer's kit used to call modules written in C/C++ code.

The OpenGL ES 514 is a library that allows for the use of OpenGL, a three-dimensional graphics library, for embedded systems (ES).

The window manager 334 is in charge of a screen related to an application. That is, the window manager 334 receives information related to the screen resolution of an application and creates a screen based on the screen resolution.

Referring to the resolution adjustment method illustrated in FIG. 5, the window manager 334 performs the resolution information reception process S420. That is, the window manager 334 receives window metadata related to resolution information from the image stream producers 510. Also, the window manager 334 sends to the surface flinger 350 information on the second resolution selected in the resolution selection process S430 performed by the second framework layer 340 as illustrated in FIGS. 6 and 7.

The OpenGL ES Apps 531 correspond to applications that use the OpenGL EL.

The surface flinger 350 receives from the window manager 334 metadata on the first resolution corresponding to the system resolution and the second resolution corresponding to the resolution of an application.

Moreover, the surface flinger 350 performs the component arrangement process S441. In this instance, the surface flinger 350 controls graphic layers in the application according to the ratio of the first and second resolutions. In this occasion, the surface flinger 350 may receive buffer data from the GLConsumer 542. In this case, the received buffer data may be buffer data that is adjusted based on the second resolution.

The hardware composer 360 performs the frame creation process S442. In the frame creation process S442, a plurality of objects on the execution screen are up-scaled according to the ratio of the first and second resolutions. The up-scaled frame is sent to a display LCD, and the display displays the up-scaled frame.

Figure 10:
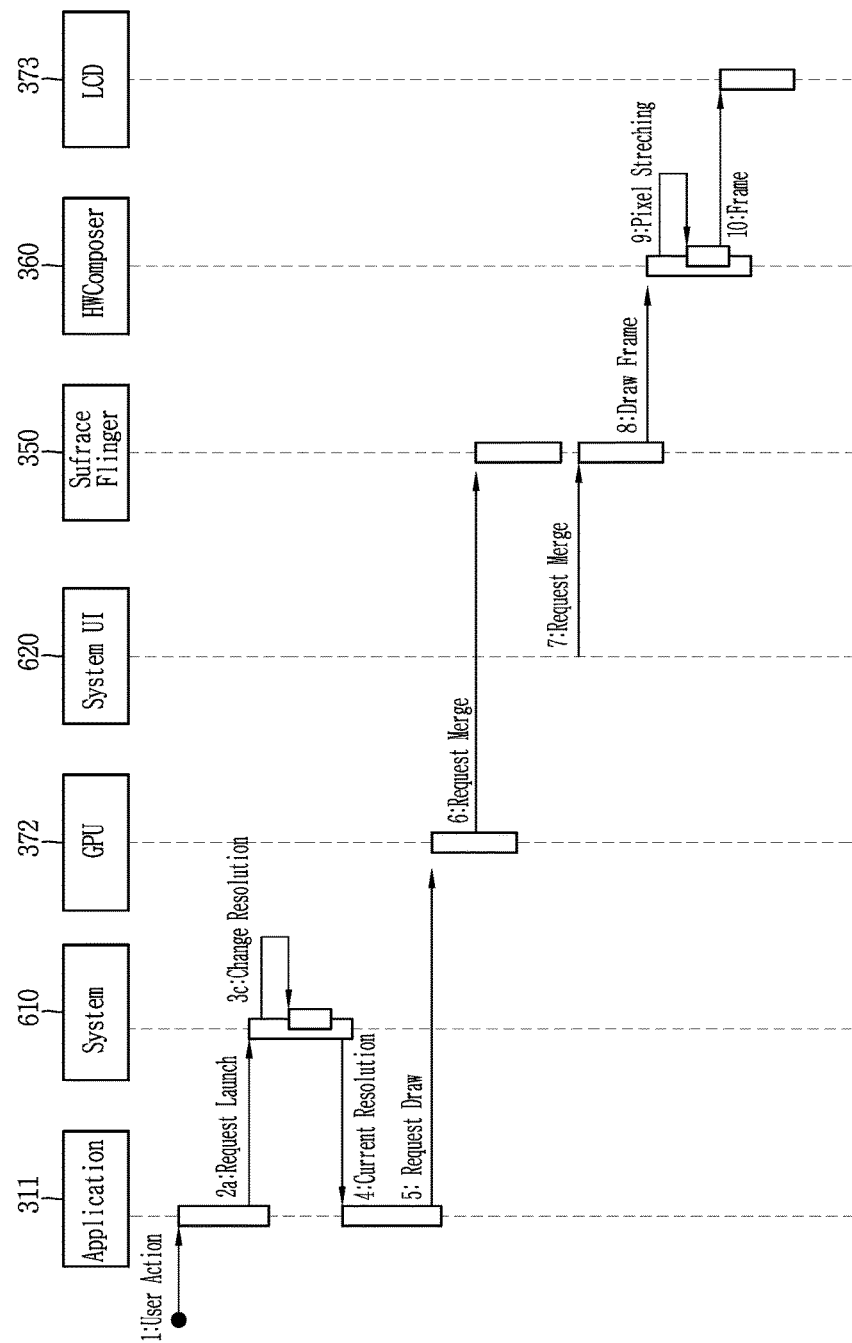
FIG. 10 is a signal flowchart of a dynamic resolution control method according to the present invention.

FIG. 10 is a signal flowchart of a dynamic resolution control method according to the present invention.

Referring back to FIG. 7, the dynamic resolution control method may be performed by the target application 311, the surface flinger 350, the hardware composer 360, and the display (LCD) 373.

Moreover, the dynamic resolution control method may be additionally performed by a system 610 and a system UI 620. Here, the signal flow in the system 610 and system UI 620 may be performed by the second framework layer 340 of FIG. 6.

First of all, the target application 311 receives a user input (User Action) 1 for executing the application from the user. In response to the user input, the system 610 receives Request Launch 2 corresponding to the execution of the application from the target application 311. That is, in the system 610, a process observer receives Request Launch 2 corresponding to the execution of the application from an activity manager.

The system 610 performs Change Resolution 3 to change the system resolution from the first resolution to the second resolution, which is the application's resolution. Also, the system 610 performs the transmission of information on Current Resolution 4 to send information on the second resolution to the target application 311.

Meanwhile, the target application 311 sends to the GPU 372 a creation request (Request Draw) 5 for creating an execution screen of the application. In this case, the GPU 372 does not perform repetitive scaling on each of a plurality of objects of the application. That is, the GPU 372 sends to the surface flinger 360 a first merge request (Request Merge) 6 for merging a second screen, which is the execution screen of the application where the plurality of objects are arranged, into a full screen.

The system UI 620 sends to the surface flinger 360 a second merge request (Request Merge) 7 for merging a first screen, which is a basic UI screen where the application is arranged, into a full screen.

The surface flinger 360 sends to the hardware composer 360 a frame creation request (Draw Frame) 8 for receiving the first and second merge requests and creating a full screen.

The hardware composer 360 performs Pixel Stretching 9 to up-scale the full screen according to the ratio of the first and second resolutions, the first resolution corresponding to the system resolution, and the second resolution corresponding to a resolution selected by the application. The hardware composer 360 sends the pixel-stretched frame 10 to the display 373 so that a screen whose resolution is dynamically controlled is displayed on the display 373.

FIG. 11 is a signal flowchart of a dynamic resolution control method according to another embodiment of the present invention.

Referring to FIG. 11, the dynamic resolution control method may be performed by the target application 311, the surface flinger 350, the hardware composer 360, the display (LCD) 373, the system 610, and the system UI 620.

Moreover, the dynamic resolution control method may be additionally performed by a process observer 341, a package analyzer 444, and a process filter 342. Here, the signal flow in the process observer 341, package analyzer 444, process filter 342, system 610, and system UI 620 may be performed by the second framework layer 440 of FIG. 8.

First of all, the target application 311 receives a user input (User Action) 1 for executing the application from the user. In response to the user input, the system 610 receives Request Launch 2a corresponding to the execution of the application from the target application 311. That is, in the system 610, a process observer receives Request Launch 2a corresponding to the execution of the application from an activity manager.

Next, the process observer 341 receives an application launch request (Launch App) 2b from the system 610. In response to this request, the process observer 341 sends an application resolution check request (Check App resolution) 2c to the packager analyzer 444. In response to this request, the package analyzer 444 sends an application check request (Check Apps) 2d to the process filter 342. In response to this request, the process filter 342 creates a resolution change request (Enable Change Resolution) 3a to the package analyzer 444. The package analyzer 444 sends a resolution setting request (SetResolution) 3b to the system 610.

The system 610 performs Change Resolution 3c to change the system resolution from the first resolution to the second resolution, which is the application's resolution.

Meanwhile, if it is determined that resolution change is unnecessary, the process filter 342 creates a resolution change disable request (Disable Change Resolution) 3d and sends it to the package analyzer 444.

Also, the system 610 performs the transmission of information on Current Resolution 4 to send information on the second resolution to the target application 311.

Meanwhile, the target application 311 sends to the GPU 372 a creation request (Request Draw) 5 for creating an execution screen of the application. In this case, the GPU 372 does not perform repetitive scaling on each of a plurality of objects of the application. That is, the GPU 372 sends to the surface flinger 360 a first merge request (Request Merge) 6 for merging a second screen, which is the execution screen of the application where the plurality of objects are arranged, into a full screen.

The system UI 620 sends to the surface flinger 360 a second merge request (Request Merge) 7 for merging a first screen, which is a basic UI screen where the application is arranged, into a full screen.

The surface flinger 360 sends to the hardware composer 360 a frame creation request (Draw Frame) 8 for receiving the first and second merge requests and creating a full screen.

The hardware composer 360 performs Pixel Stretching 9 to up-scale the full screen according to the ratio of the first and second resolutions, the first resolution corresponding to the system resolution, and the second resolution corresponding to a resolution selected by the application. The hardware composer 360 sends the pixel-stretched frame 10 to the display 373 so that a screen whose resolution is dynamically controlled is displayed on the display 373.

It is needless to say that the configurations and functions related to the above-described dynamic resolution control method may be used in combination with the configurations and functions of individual components of a mobile terminal that perform dynamic resolution control.

As discussed above, at least one of the embodiments of the present invention has the advantage of performing dynamic resolution control by selecting the resolution of an execution screen where an application is executed and displaying the execution screen based on the resolution.

According to at least one of the embodiments of the present invention, a processing time and power consumption can be reduced by combining screens including a plurality of objects and upscaling the combined screens at once.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may also include the controller 180 of the mobile terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

The invention claimed is:

1. A mobile terminal comprising:
a display unit for receiving a user input for executing applications including a plurality of objects;
a memory for storing setting information displaying, at a first resolution, a screen on the display unit;
a control unit for receiving information on a plurality of resolutions supported by the applications, selecting a second resolution, which is the resolution of an execution screen on which one of the applications is executed, on the basis of the first resolution and the plurality of resolutions, and configuring the execution screen by synthesizing the plurality of objects with a system user interface (UI) according to the second resolution,
wherein the control unit comprises:

a central processing unit (CPU) capable of performing re-arrangement of the plurality of objects on the screen; and a graphics processing unit (GPU) that synthesizes a full screen using a second screen including the plurality of objects of the one of the applications with a first screen of the system UI, and up-scales the configured execution screen according to a ratio of the first and second resolutions so as to display the up-scaled execution screen on the display unit, wherein the second screen is an initial screen which appears when the one of the applications is executed, and the second resolution is dynamically selected by each of the applications, and wherein the GPU up-scales the full screen corresponding to the execution screen including the plurality of objects at once according to the ratio of the first and second resolutions, by stretching the pixels of the plurality of objects based on the ratio of the first and second resolutions.

2. The mobile terminal of claim 1, wherein the second resolution has minimum difference with the first resolution, among the plurality of resolutions.

3. The mobile terminal of claim 1, wherein the control unit receives measurement values of factors associated with the change of the second resolution and selects a third resolution, which is lower than the second resolution, based on the received measurement values, and wherein the factors are based on a remaining battery power, a temperature sensed by a power manager managing power consumption of each application, frames per second (FPS) required for each of the application in an FPS mode initiated to adjust a number of frames per second displayed on the screen of the application, and the setting information.

4. The mobile terminal of claim 1, wherein the control unit executes the application at an application layer, receives the setting information at a framework layer, selects the second resolution on the basis of the first resolution and the plurality of resolutions, displays the execution screen at the second resolution, and performs the power management, memory management, and hardware management of the mobile terminal at a kernel layer.

5. The mobile terminal of claim 4, wherein the first framework layer comprises a first framework layer including an activity manager, a package manager, a window state manager, a window manager, and an input manager.

6. The mobile terminal of claim 5, wherein the framework layer further comprises a second framework layer including a process observer, a packager analyzer, a process filter, a scaler, a trigger monitor, and a task migrator.

7. The mobile terminal of claim 6, wherein the framework layer further comprises:

a surface flinger that controls graphic layers in the application according to the ratio of the first and second resolutions; and a hardware composer that up-scales the execution screen with the plurality of objects arranged thereon according to the ratio of the first and second resolutions.

8. The mobile terminal of claim 6, wherein the process observer receives a launch request (Request Launch) corresponding to the execution of the application from the activity manager, the package analyzer extracts information on the plurality of resolutions from the application, the process filter changes the resolution from the first resolution to the second resolution and determines whether to apply the second resolution or not, and the scaler sends information on the second resolution to the window manager.

9. The mobile terminal of claim 6, wherein the kernel layer comprises a power manager, and wherein the trigger monitor receives information on the temperature from the power manager and receives information on the FPS and information on the user setting.

10. A mobile terminal comprising:

a display unit for receiving a user input for executing applications;

a memory for storing setting information displaying, at a first resolution, a screen on the display unit; and a control unit for receiving information on a plurality of resolutions supported by the applications, selecting a second resolution, which is the resolution of an execution screen on which one of the applications is executed, on the basis of the first resolution and the plurality of resolutions, wherein the control unit comprises:

a central processing unit (CPU) capable of performing re-arrangement of the plurality of objects on the screen; and a graphics processing unit (GPU) that synthesizes a full screen using a second screen including the plurality of objects of the one of the applications with a first screen of a system user interface (UI), and up-scales the execution screen according to a ratio of the first and second resolutions so as to display the up-scaled execution screen on the display unit, wherein the second screen is an initial screen which appears when the one of the applications is executed, and the second resolution is dynamically selected by each of the applications, and wherein the GPU up-scales the full screen corresponding to the execution screen including the plurality of objects at once according to the ratio of the first and second resolutions, and displays the execution screen on the display unit, by stretching the pixels of the plurality of objects based on the ratio of the first and second resolutions.

11. The mobile terminal of claim 10, wherein the second resolution has minimum difference with the first resolution, among the plurality of resolutions.

12. The mobile terminal of claim 10, wherein the control unit receives measurement values of factors associated with the change of the second resolution and selects a third resolution, which is lower than the second resolution, based on the received measurement values, and wherein the factors are based on a remaining battery power, a temperature sensed by a power manager managing power consumption of each application, frames per second (FPS) required for each of the application in an FPS mode initiated to adjust a number of frames per second displayed on the screen of the application, and the setting information.

13. The mobile terminal of claim 10, wherein the control unit comprises:

a process observer that receives a launch request (Request Launch) corresponding to the execution of the application from an activity manager; and a package analyzer that extracts information on the plurality of resolutions from the application.

14. The mobile terminal of claim 10, wherein the control unit comprises:

a process filter that changes the resolution from the first resolution to the second resolution and determines whether to apply the second resolution or not; and a scaler that sends information on the second resolution to a window manager.

* * * * *